United States Patent
Vargas

(10) Patent No.: US 8,376,068 B2
(45) Date of Patent: Feb. 19, 2013

(54) RECHARGEABLE AUTOMOBILE ELECTRIC POWER SYSTEM AND SIMPLE SWITCHING MECHANISM BETWEEN GAS ENGINE AND ELECTRIC MOTOR

(75) Inventor: Joseph L. Vargas, Sparks, NV (US)

(73) Assignee: Edak, LLC, Reno, NV (US)

(*) Notice: Subject to any disclaimer, the term of this patent is extended or adjusted under 35 U.S.C. 154(b) by 667 days.

(21) Appl. No.: 12/567,742

(22) Filed: Sep. 26, 2009

(65) Prior Publication Data

US 2010/0012402 A1 Jan. 21, 2010

Related U.S. Application Data

(63) Continuation-in-part of application No. 12/147,437, filed on Jun. 26, 2008, now Pat. No. 8,118,121.

(51) Int. Cl.
*B60K 7/00* (2006.01)
(52) U.S. Cl. .......... 180/62; 180/56; 180/65.285
(58) Field of Classification Search .......... 180/56, 180/62, 65.1, 65.21, 65.22, 65.26, 65.275, 180/65.285, 65.31, 65.51, 65.6, 65.8, 165, 180/291; 29/401.1, 402.03; 903/906; 701/22
See application file for complete search history.

(56) References Cited

U.S. PATENT DOCUMENTS

| | | | | |
|---|---|---|---|---|
| 4,270,622 A * | 6/1981 | Travis | | 180/65.31 |
| 4,928,227 A * | 5/1990 | Burba et al. | | 701/66 |
| 5,019,755 A * | 5/1991 | Walker | | 318/13 |
| 5,105,517 A * | 4/1992 | Barnow | | 29/401.1 |
| 5,689,174 A * | 11/1997 | Pacheco, Sr. | | 322/16 |
| 6,978,853 B2 * | 12/2005 | Bennett | | 180/65.1 |
| 7,134,517 B1 * | 11/2006 | Kaiser et al. | | 180/65.6 |
| 7,325,638 B1 * | 2/2008 | Belloso et al. | | 180/69.6 |
| 7,363,995 B2 * | 4/2008 | Downs et al. | | 180/65.1 |
| 7,445,067 B2 * | 11/2008 | Marsh et al. | | 180/65.51 |
| 7,628,236 B1 * | 12/2009 | Brown | | 180/65.21 |
| 7,992,662 B2 * | 8/2011 | King et al. | | 180/65.22 |
| 8,118,121 B2 * | 2/2012 | Vargas | | 180/65.24 |
| 2006/0000650 A1 * | 1/2006 | Hughey | | 180/65.2 |
| 2006/0108161 A1 * | 5/2006 | Feliss et al. | | 180/65.2 |
| 2006/0272863 A1 * | 12/2006 | Donahue | | 180/2.2 |
| 2007/0163819 A1 * | 7/2007 | Richter et al. | | 180/65.2 |
| 2008/0053726 A1 * | 3/2008 | Marsh et al. | | 180/65.5 |
| 2008/0223633 A1 * | 9/2008 | Kim | | 180/65.2 |
| 2008/0236910 A1 * | 10/2008 | Kejha et al. | | 180/65.2 |
| 2009/0024267 A1 * | 1/2009 | Kawai | | 701/22 |
| 2009/0166106 A1 * | 7/2009 | Batdorf | | 180/24.06 |
| 2009/0242289 A1 * | 10/2009 | Murty | | 180/65.265 |
| 2009/0294188 A1 * | 12/2009 | Cole | | 180/65.1 |
| 2009/0321155 A1 * | 12/2009 | Vargas | | 180/62 |
| 2010/0044129 A1 * | 2/2010 | Kyle | | 180/65.25 |
| 2010/0193269 A1 * | 8/2010 | Fuchtner et al. | | 180/65.22 |
| 2010/0224430 A1 * | 9/2010 | Bennett et al. | | 180/65.51 |
| 2011/0000721 A1 * | 1/2011 | Hassett et al. | | 180/65.22 |
| 2011/0079454 A1 * | 4/2011 | Maguire et al. | | 180/65.25 |
| 2011/0094806 A1 * | 4/2011 | Mack et al. | | 180/65.6 |
| 2011/0094807 A1 * | 4/2011 | Pruitt et al. | | 180/65.6 |
| 2011/0218070 A1 * | 9/2011 | Mack et al. | | 475/150 |

* cited by examiner

*Primary Examiner* — Katy M Ebner
*Assistant Examiner* — Brodie Follman
(74) *Attorney, Agent, or Firm* — Mark A. Goodman, Esq.

(57) ABSTRACT

A rechargeable automobile electric power system and method for modifying a front-wheel drive automobile through installation of the system is disclosed. The system includes basic plug-in rechargeable electric drive power units, one that can run simultaneously with the gas motor to improve gas mileage. The second puts a one or two speed gear box between the electric motor and the wheel. This will allow the vehicle to run on rechargeable electric power in town and on the highway.

13 Claims, 4 Drawing Sheets

RECHARGEABLE AUTOMOBILE ELECTRIC POWER SYSTEM AND SIMPLE SWITCHING MECHANISM BETWEEN GAS ENGINE AND ELECTRIC MOTOR

CROSS REFERENCE TO RELATED APPLICATIONS

This application is a Continuation-In-Part of Application of application Ser. No. 12/147,437 filed on Jun. 26, 2008 now U.S. Pat. No. 8,118,121.

FIELD OF THE INVENTION

The present invention relates generally to drive systems and methods for hybrid electric and fuel driven automobiles. More particularly, the present invention relates to a system and method for a simple switching between a gas engine and an electric motor installed on a rear axle of a front-wheel drive automobile optionally including the addition of a one or two speed gear box between the electric motor and the electric motor drive wheel.

BACKGROUND

With the soaring gasoline prices worldwide and global warming gaining awareness, the need for alternative methods is undeniable. The price of gasoline has increased more than 150 percent in the last five years. Fuel-saving technology is also essential for both automakers who hope to compete in the next decade and for a nation stricken by energy problems. In order to meet the increased demand, automakers from around the world have increased their hybrid and electric vehicle production and have put them on fast-track schedules.

A hybrid is a vehicle that has two power source, a gasoline engine and an electric motor. They are both utilizing the same drive train and cannot be used separately. Soaring gasoline prices are causing more and more people to consider purchasing a hybrid car. The hybrid, however is priced significantly higher than similar gas engine models. Some are as much as several thousand dollars higher in cost. For example, the cost of hybrid cars ranges from $19,000 to $25,000 compared to conventional fuel-efficient vehicles that cost anywhere between $14,000 to $17,000. In general, hybrid cars get twenty per cent better mileage than regular cars but cost thousands of dollars more. It will take several years of driving to recoup the difference in better mileage. Consumer advocate testing has shown that hybrid savings in fuel economy usually fails to offset the extra purchase price. Therefore, there exists an unfilled need for a system and method capable cost-effectively adding an electric drive component to an existing internal combustion engine powered automobile having a simple switching mechanism between electric drive component and existing internal combustion engine.

SUMMARY OF ONE EMBODIMENT OF THE INVENTION

Advantages of one or More Embodiments of the Present Invention

The various embodiments of the present invention may, but do not necessarily, achieve one or more of the following advantages:

The ability to cost-effectively increase the fuel-efficiency of an existing front-wheel drive automobile.

The ability to convert a front-wheel drive automobile to a modified hybrid vehicle.

The ability to switch between a gas engine and an electric motor of a front-wheel drive automobile by a simple switching mechanism.

The ability to utilize two separate power sources in a front-wheel drive automobile.

These and other advantages may be realized by reference to the remaining portions of the specification, claims, and abstract.

Brief Description of One Embodiment of the Present Invention

In one embodiment, the invention comprises a rechargeable automobile electric power system. The system comprises: an electric drive axle unit configured to replace an existing unpowered rear axle of a front-wheel drive automobile, an electric motor powered by one or more rechargeable batteries, an electric motor speed controller in connection with the one or more rechargeable batteries and the electric motor. It also includes an electric solenoid main switch configured to turn on one or more batteries to the electric motor speed controller to turn on the electric motor. The electric motor is further configured to drive at least one of the rear wheels of the front-wheel drive automobile.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

Figure 1:
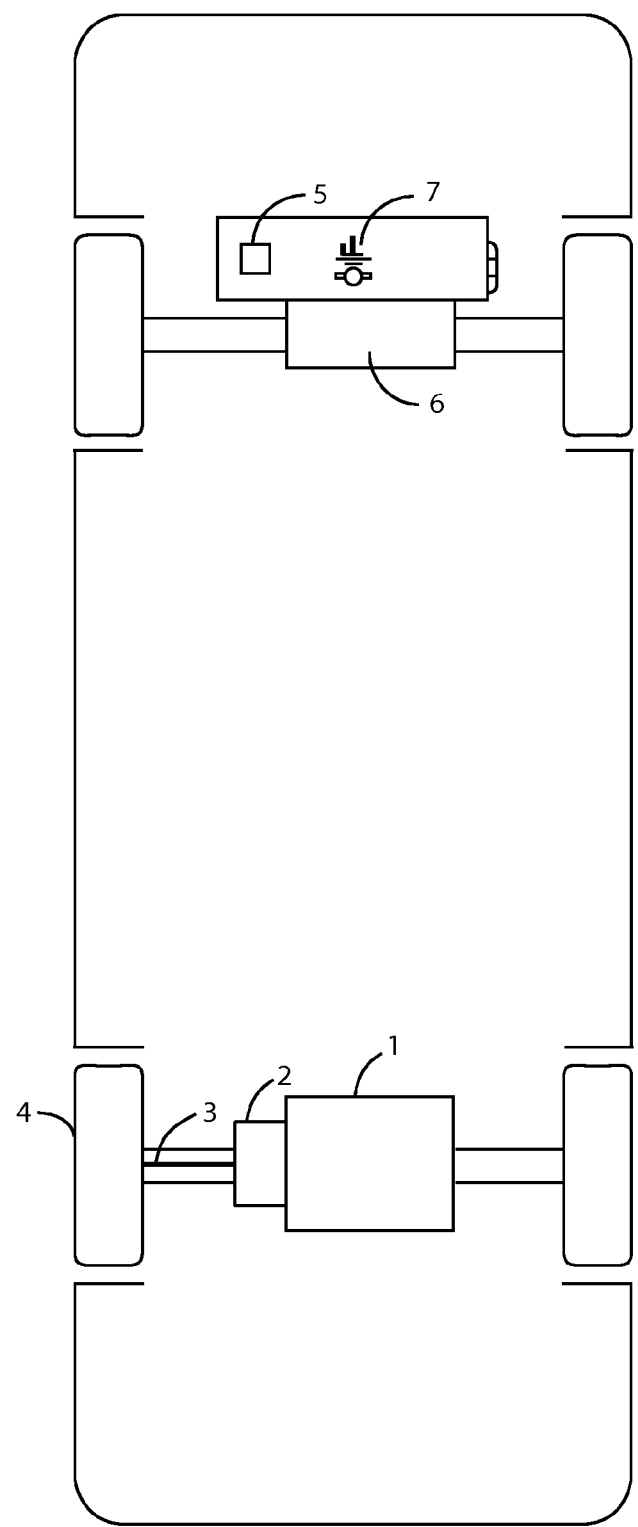
FIG. 1 is substantially a schematic representation of one embodiment of the present invention.
Figure 2:
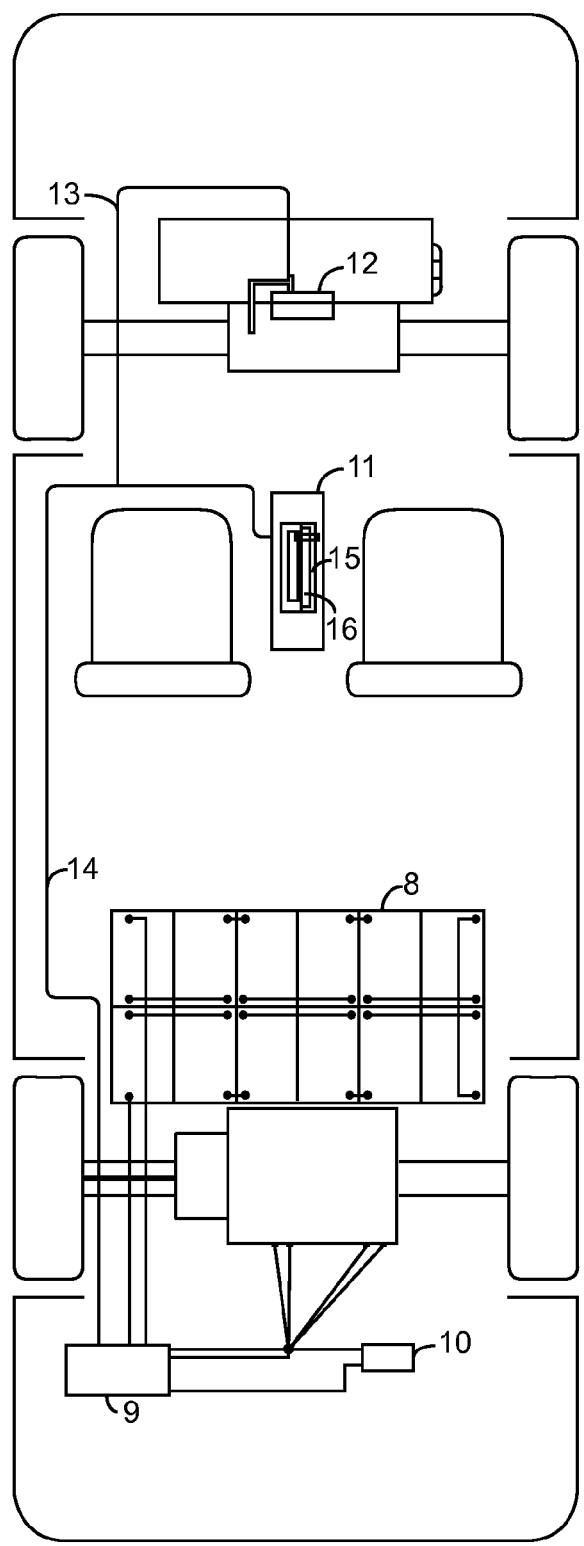
FIG. 2 is substantially a schematic representation of one embodiment of the invention including a switching mechanism.
Figure 3:
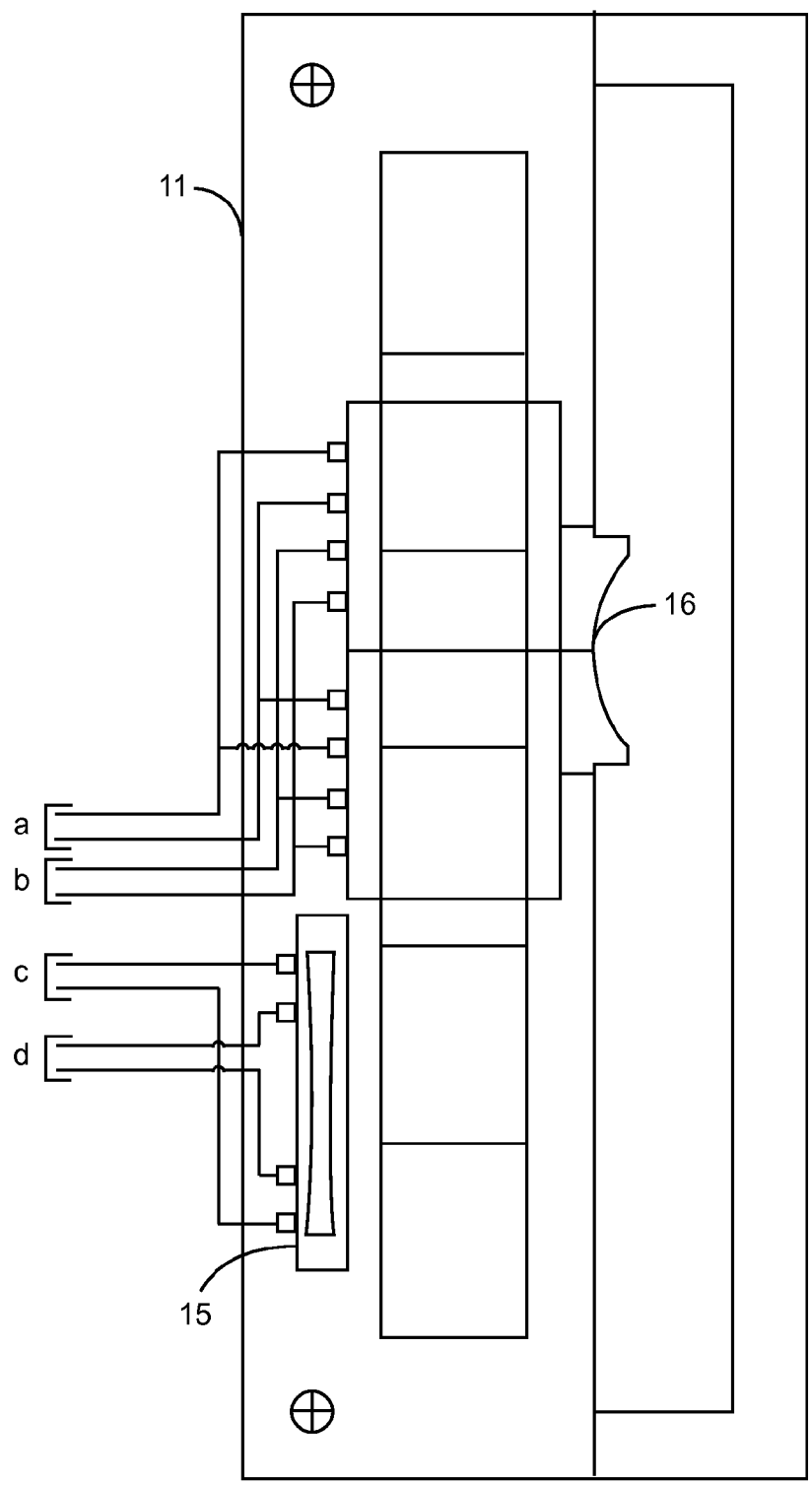
FIG. 3 is substantially a schematic representation of one embodiment of the invention showing a shift and throttle switch.
Figure 4:
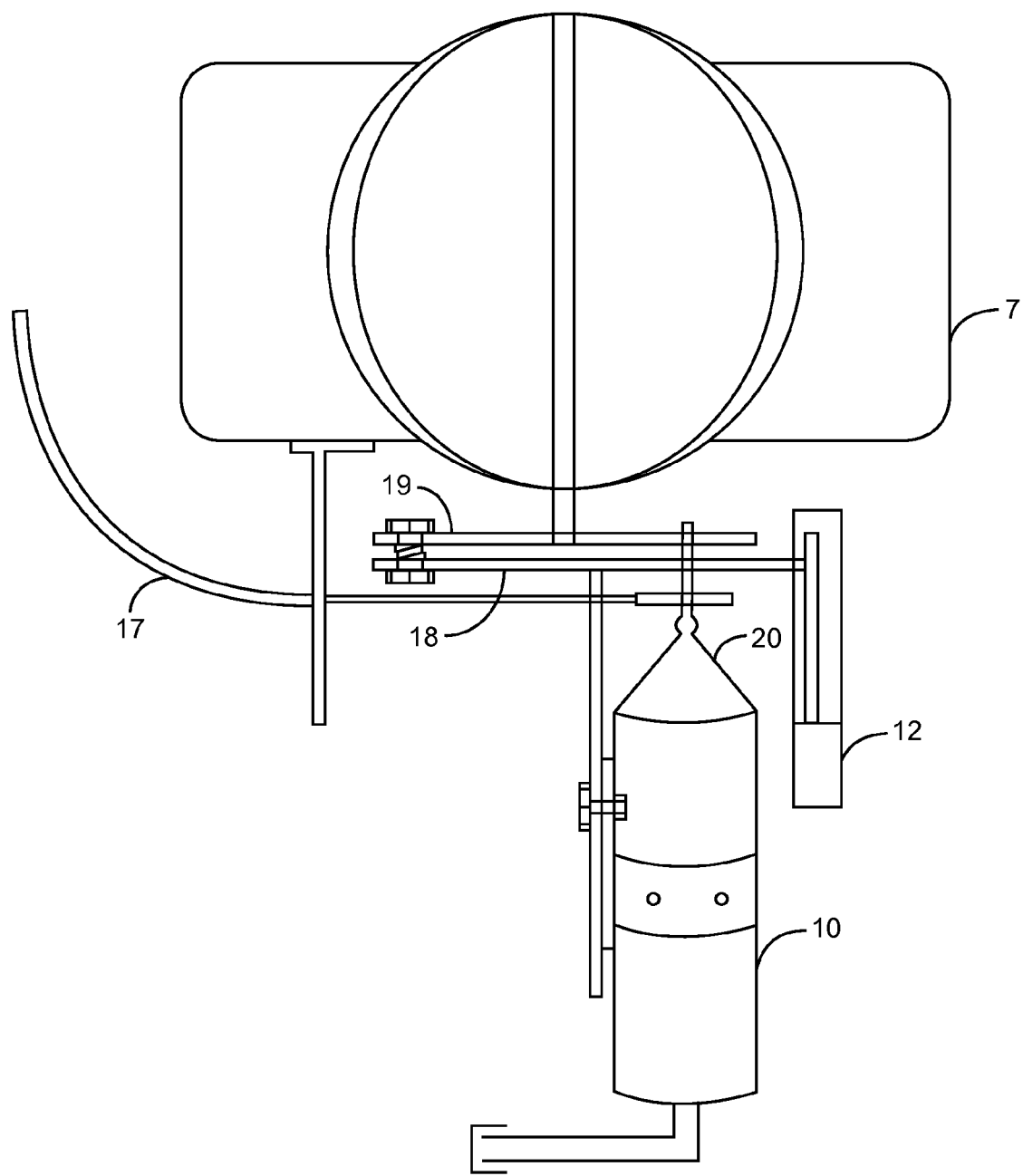
FIG. 4 is substantially a schematic representation of one embodiment of the invention showing a switching mechanism.

In the following detailed description of the preferred embodiment, reference is made to the accompanying drawings, which from a part of this application. The drawings show, by way of illustration, specific embodiments in which the invention may be practiced. It is to be understood that other embodiments may be utilized and structural changes may be made without departing from the scope of the present invention.

The following is a listing of the reference numbers included in the original drawings and the element that each reference number corresponds to and a brief description:

1. Electric Motor. Many variations on size and horse power would be operable in accordance with the present invention.
2. One or Two Speed Gear Box. This optional speed gear box is connected between the electric drive axle unit 3 and the electric motor 1.
3. Electric Drive Axle Unit. This may also be referred to as an armature axle. This is the axle powered by the electric motor 1.
4. Rear Wheel. This is a first rear wheel of a front-wheel drive automobile.
5. Gas Engine. This is the standard internal combustion engine that comes with most vehicles today. The system of the present invention does not connect to the existing power train.
6. Transaxle. This is the existing transaxle.
7. Carburetor. The electric motor accelerator switch 12 can be configured to place at the carburetor, or at the gas pedal.
8. One or More Rechargeable Batteries. These may vary in size, shape, location, configuration, and power.
9. Electric Motor Speed Controller. This controller controls the speed of the electric motor 1.
10. Electric Solenoid Main Switch. This is the main off on switch for the electric drive power system.
11. Shift and Throttle Switch. This switch is designed to switch a throttle from a gas drive to an electric drive.
12. Electric Motor Accelerator Switch. The electric motor 1 is engaged and controlled by the electric motor accelerator switch through the shift and throttle switch 11.
13. Electric Motor Accelerator Switch Wiring. This connects the electric motor accelerator switch 12 and the shift and throttle switch 11.
14. Wiring Harness. This connects the shift and throttle switch 11 and the electric motor speed controller 9.
15. Main On and Off Switch. This is the part of shift and throttle switch 11 having the wiring to electric motor speed controller 'c' and the wiring to electric solenoid main switch 'd' to individually turn on the electric motor speed controller 9 and the electric solenoid main switch 10.
16. One or More Switches. These switches have the wiring to electric motor accelerator switch 'a' and the wiring to rechargeable batteries 'b'. Using these switches, the polarity can be reversed thereby enabling the withdrawal and expansion of the solenoid 20 to pull the throttle arm for electric motor 18 and the throttle arm for gas motor 19. These may also release the throttle for the gas motor to allow the electric motor to run separately.
17. Throttle Cable. This is the existing throttle cable.
18. Throttle Arm for Electric Motor. This is the existing throttle arm for electric motor.
19. Throttle Arm for Gas Motor. This is the existing throttle arm for gas motor.
20. Solenoid: Electric to gas solenoid switch. This switch enables the vehicle to run on just gas, just electric, or both.

The present invention comprises a rechargeable automobile electric power system. The invention includes an electric motor 1 that is powered by one or more rechargeable batteries 8. The electric motor 1 may be attached to an electric drive axle unit 3 in line with a one or two speed gear box and to one drive wheel. The invention further includes an electric motor speed controller 9 in connection with the one or more rechargeable batteries 8 and the electric motor 1, an electric solenoid main switch 10 configured to turn on or off one or more batteries. An electric solenoid switch used to run on gas, electric, or both.

The system can be added to any front-wheel drive vehicle. This is designed to give any vehicle two separate and different engines. One is the gas power system comprising a gas engine 5, transaxle 6, and a carburetor 7. The gas engine 5 drives at least one of the front wheels of the front-wheel drive automobile and is powered generally by gasoline or diesel. The other source is rechargeable electric power. The one or more rechargeable batteries 8 for the electric motor 1 can be 12-12 volt batteries wired in series adding up to 144 volts. Preferably, this system may be used in front-wheel drive cars. With a one or two speed gear box this system can be used for both city and highway driving.

As discussed in the background, while it would take years to justify the purchase of a hybrid vehicle through gas savings, adding electric power to an existing front-wheel drive vehicle according to the present invention today will pay for its self in a short time. The cost of purchasing and installing the system of the present invention is expected to be a small fraction of the cost to purchase a new hybrid vehicle.

The electric motor 1 can come in different shapes and sizes that will be determined by the weight and design of the vehicle. The level of horse power of this electric motor 1 can also be varied widely in accordance with the present invention. One or two speed gear box 2 is optional to be connected between the electric drive axle unit 3 and the electric motor 1.

The electric drive axle unit 3 may be of in different lengths contain different lug bolt patterns to fit the model of vehicle.

One of the main advantages of this electric motor system is that it can be installed on an existing front-wheel drive vehicle. It is estimated that in one year gas will continue to rise. This could almost make automobiles obsolete given the level of fuel-efficiency of most automobiles today. However, a system capable of providing drastically limited fuel consumption for city driving, without the cost of a new car, could restore the freedom of driving that many have grown accustomed to.

The system of the present invention is designed as a unit meant to replace a rear axle of a front-wheel drive vehicle. The system comprises: an electric drive axle unit 3 configured to replace an existing unpowered rear axle of a front-wheel drive automobile, an electric motor 1 powered by one or more rechargeable batteries 8, an electric motor speed controller 9 in connection with the rechargeable batteries 8 and the electric motor 1. It also includes an electric solenoid main switch 10 configured to turn on one or more batteries to the electric motor speed controller 9 to turn on the electric motor 1. The electric motor 1 is further configured to drive at least one of the rear wheels 4 of the front-wheel drive automobile. There may be an optional two wheel electric drive axle unit that would drive the two rear wheels.

Optionally, the present invention may include a shift and throttle switch 11 being coupled to an electric motor accelerator switch 12 which is in connection with a gas power system of the front-wheel drive automobile such that the electric motor 1 is engaged and controlled by the shift and throttle switch 11 when the electric motor accelerator switch 12 is on, and the electric motor 1 is disengaged and ceases to be controlled by a gas engine 5 when the electric motor accelerator switch 12 is off. One of ordinary skill in the art would recognize numerous methods by which this coupling could be accomplished.

The shift and throttle switch 11 is designed to perform a simple switching mechanism to switch a throttle from the gas engine 5 to the electric motor 1 when in a neutral mode and back to the gas engine 5 when put in a drive mode.

The shift and throttle switch 11 may further include a main on and off switch 15 to individually turn on the electric solenoid main switch 10 and the electric motor speed controller 9 to connect a high voltage system by the activation of the one or more batteries and to control the voltage to the electric motor 1.

Thus the shift and throttle switch 11 and the electric motor accelerator switch 12 make the electric drive unit as simple as shifting it would be from forward to reverse. The way the system is designed keeps it user friendly and keeps the installation simple. The shift and throttle switch 11 is not more than a half inch thick and would easily fasten to the console.

Shifting into neutral will automatically switch solenoid 20 allowing a throttle reversing switches 17 to pull only on a throttle arm for electric motor 18 when current is added. When current is reversed by shifting into drive, the solenoid 20 would extend and gets connected with the carburetor 7 of the gas power system pulling the throttle arm for electric motor 18 and a throttle arm for gas motor 19 forward. If the electric motor accelerator switch 12 is on in this position both motors would accelerate. If the electric motor accelerator switch 12 is off then only the gas motor would respond.

Thus the back and forth movement of the solenoid 20 switches the throttle from a gas drive to an electric drive. If faster speeds or additional power is needed, the vehicle could be shifted into the drive mode thereby engaging the existing gas engine 5 at the same time as the electric motor 1 of the system is also engaged. The shift and throttle switch 11 could even completely disengage the electric drive when the front-wheel automobile is in the drive mode.

An electric motor accelerator switch wiring 13 connects the electric motor accelerator switch 12 and the shift and throttle switch 11.

A wiring harness 14 connects the shift and throttle switch 11 and the electric motor speed controller 9.

In an alternative embodiment, the present invention comprises a modifying of a front-wheel drive automobile comprising:
a. removing a rear axle of the front-wheel drive automobile;
b. installing a rechargeable automobile electric power system in place of the rear axle;
c. connecting a wheel to each end of the rechargeable automobile electric power system; wherein the rechargeable automobile electric power system comprises the system described above.

The method may further include the installation of a shift and throttle switch 11, the shift and throttle switch 11 being coupled to an electric motor accelerator switch 12 which is in connection with a gas power system of the front-wheel drive automobile such that an electric motor 1 is engaged and controlled by the shift and throttle switch 11 when the electric motor accelerator switch 12 is on, and the electric motor 1 is disengaged and ceases to be controlled by a gas engine 5 when the electric motor accelerator switch 12 is off. The shift and throttle switch 11 may also be configured to turn on when the front-wheel drive automobile is shifted into neutral and switch off when the front-wheel drive automobile is shifted out of neutral.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A rechargeable automobile electric power system, comprising:
   a. an electric drive axle unit; wherein the electric drive axle unit is configured to replace an existing unpowered rear axle of a front-wheel drive automobile;
   b. an electric motor;
   c. one or more rechargeable batteries wired in series and configured to supply power to the electric motor; wherein the electric motor is further configured to drive at least one of the rear wheels of the front-wheel drive automobile;
   d. an electric motor speed controller in connection with the one or more rechargeable batteries and the electric motor; wherein the electric motor speed controller controls the speed of the electric motor;
   e. an electric solenoid main switch; wherein the electric solenoid main switch is configured to turn on one or more battery cables to the electric motor speed controller to turn on the electric motor.

2. The rechargeable automobile electric power system of claim 1 further comprising a standard gas pedal solenoid switch that switches a gas pedal from gas to electric or both gas and electric.

3. The rechargeable automobile electric power system of claim 2 wherein a shift and throttle switch switches a throttle to the rechargeable electric power system when the front-wheel drive automobile is in a neutral mode and switches the throttle to the gas power system when the front-wheel drive automobile is in a drive mode.

4. The rechargeable automobile electric power system of claim 2 wherein the shift and throttle switch comprises one or more switches that reverse polarity to engage and disengage a gas engine.

5. The rechargeable automobile electric power system of claim 2 wherein the shift and throttle switch further comprises a main on and off switch capable of controlling the electric solenoid main switch and the electric motor.

6. The rechargeable automobile electric power system of claim 2 wherein an electric motor accelerator switch wiring connects an electric motor accelerator switch and the shift and throttle switch.

7. The rechargeable automobile electric power system of claim 2 wherein a wiring harness connects the shift and throttle switch and the electric motor speed controller.

8. The rechargeable automobile electric power system of claim 2 further comprising a gas power system comprising a gas engine, a transaxle, and a carburetor.

9. The rechargeable automobile electric power system of claim 8 wherein the gas engine drives at least one of the front wheels of the front-wheel drive automobile.

10. A method of modifying a front-wheel drive automobile comprising:
    a. removing a rear axle of the front-wheel drive automobile;
    b. installing a rechargeable automobile electric power system in place of the rear axle;
    c. connecting a wheel to each end of the rechargeable automobile electric power system; wherein the rechargeable automobile electric power system comprises:

i. an electric drive axle unit; wherein the electric drive axle unit is configured to replace an existing unpowered rear axle of a front-wheel drive automobile;
ii. an electric motor;
iii. one or more rechargeable batteries wired in series and configured to supply power to the electric motor; wherein the electric motor is further configured to drive at least one of the rear wheels of the front-wheel drive automobile;
iv. an electric motor speed controller in connection with the one or more rechargeable batteries and the electric motor; wherein the electric motor speed controller controls the speed of the electric motor;
v. an electric solenoid main switch; wherein the electric solenoid main switch is configured to turn on and off one or more battery cables to the electric motor speed controller to turn on the electric motor.

11. The method of claim 10 further comprising installing a shift and throttle switch; wherein upon installation the shift and throttle switch is coupled to the electric motor speed controller, and coupled to an electric motor accelerator switch connected to a gas power system of the front-wheel drive automobile such that the electric motor is engaged and controlled by the electric motor accelerator switch through the shift and throttle switch.

12. The method of claim 11 wherein the shift and throttle switch switches a throttle to the rechargeable electric power system when the front-wheel drive automobile is in a neutral mode and switches the throttle to the gas power system when the front-wheel drive automobile is in a drive mode thereby allowing a gas engine and an electric motor to be used simultaneously.

13. The method of claim 11 wherein the shift and throttle switch comprises a main on and off switch to individually turn on the electric solenoid main switch and the electric motor speed controller.

* * * * *